US009557768B2

United States Patent
Vasilevsky

(10) Patent No.: US 9,557,768 B2
(45) Date of Patent: Jan. 31, 2017

(54) PORTABLE COMPUTER VEHICLE DOCK

(71) Applicant: Alexander Vasilevsky, Rishon Lezion (IL)

(72) Inventor: Alexander Vasilevsky, Rishon Lezion (IL)

( * ) Notice: Subject to any disclaimer, the term of this patent is extended or adjusted under 35 U.S.C. 154(b) by 0 days.

(21) Appl. No.: 15/082,333

(22) Filed: Mar. 28, 2016

(65) Prior Publication Data
US 2016/0209872 A1 Jul. 21, 2016

Related U.S. Application Data

(63) Continuation of application No. 14/348,713, filed as application No. PCT/IB2012/055232 on Sep. 30, 2012, now Pat. No. 9,298,218.

(60) Provisional application No. 61/657,851, filed on Jun. 10, 2012, provisional application No. 61/542,207, filed on Oct. 2, 2011.

(51) Int. Cl.
*G06F 1/16* (2006.01)
*B60R 11/02* (2006.01)
*F16B 2/18* (2006.01)

(52) U.S. Cl.
CPC ......... *G06F 1/1632* (2013.01); *B60R 11/0252* (2013.01); *F16B 2/185* (2013.01); *G06F 1/1656* (2013.01); *Y10T 403/595* (2015.01)

(58) Field of Classification Search
CPC combination set(s) only.
See application file for complete search history.

(56) References Cited

U.S. PATENT DOCUMENTS

| | | | | |
|---|---|---|---|---|
| 4,796,849 A | | 1/1989 | Fouassier | |
| 5,477,415 A | * | 12/1995 | Mitcham | G06F 1/1632 361/679.42 |
| 6,101,087 A | * | 8/2000 | Sutton | B60R 11/0252 361/679.44 |
| 6,151,218 A | * | 11/2000 | Pirdy | G06F 1/1632 361/679.41 |
| 6,885,552 B2 | * | 4/2005 | Mullen | E05B 73/0082 312/223.2 |
| 7,130,187 B1 | * | 10/2006 | Sun | G06F 1/184 206/320 |

(Continued)

OTHER PUBLICATIONS

Light-Weight MAG Docketing Station—Panasonic Toughbook 30/31, Gamber-Johnson, LLC, 2011, 2 pages.

(Continued)

*Primary Examiner* — Lisa Lea Edmonds
(74) *Attorney, Agent, or Firm* — The Roy Gross Law Firm, LLC; Roy Gross

(57) ABSTRACT

An automatically-lockable, shock absorbing dock for a portable computer, the dock comprising: a top plate configured to receive a portable computer, said top plate comprising: an automatic locking mechanism for securing the portable computer to said top plate, a set of connectivity ports, and a port replicator configured to connect the portable computer to the set of connectivity ports; and multiple pairs of shock absorbers connected to a bottom surface of said top plate and configured to connect to a target surface, wherein each pair of shock absorbers is coaxially-positioned and connected to opposite sides of said bottom surface, and wherein each shock absorber has an essentially equal resiliency in its x, y and z axes.

7 Claims, 11 Drawing Sheets

(56) References Cited

U.S. PATENT DOCUMENTS

| | | | |
|---|---|---|---|
| 7,298,611 B1* | 11/2007 | Carnevali | G06F 1/1632 361/679.55 |
| 7,515,407 B2* | 4/2009 | Goodman | G11B 33/08 248/634 |
| 7,719,829 B2* | 5/2010 | Li | G11B 33/127 248/638 |
| 7,839,118 B2* | 11/2010 | Carnevali | G06F 1/1632 320/107 |
| 7,889,491 B2* | 2/2011 | Chiang | F16F 15/08 248/166 |
| 7,978,466 B2 | 7/2011 | Lewandowski et al. | |
| 8,179,672 B2* | 5/2012 | Carnevali | G06F 1/1632 361/679.41 |
| 2006/0023416 A1* | 2/2006 | Chen | G06F 1/1613 361/679.4 |
| 2008/0112125 A1* | 5/2008 | Martin | G11B 33/123 361/679.34 |
| 2008/0165491 A1* | 7/2008 | Iwaasa | G11B 33/124 361/679.34 |
| 2009/0310303 A1* | 12/2009 | Najbert | F04D 29/601 361/695 |
| 2010/0039766 A1* | 2/2010 | Chiang | G11B 33/08 361/679.34 |

OTHER PUBLICATIONS

Panasonic CF19 Docketing Stations, Cradle and Accessories, 7160-0049, Gamber-Johnson, LLC, 2011, pp. 1-7.

Panasonic Toughbook CF-31 Mag Docking Station, 7160-01318-00 through 7160-0318-12, Gamber-Johnson, LLC, 2011, pp. 1-8.

Panasonic CFH2 Vehicle Docking Station, 7160-0348, Gamber-Johnson, LLC, 2011, pp. 1-6.

Panasonic CF-HI/CFH2 Docking Stations, 7160-0166, 7160-0358, Gamber-Johnson, LLC, 2009, pp. 1-6.

CF53-Docking Station, 7160-0393, Gamber-Johson, LLC, 2012, 2 pages.

FZ-G1 Docking Station, 7160-0486, 7160-0487, Gamber-Johnson, LLC, 2012, 5 pages.

FZ-G1 Docking Station, 7160-0486, 7160-0487, Gamber-Johnson, LLC, 2012, 9 pages.

General Dynamics Itronix GoBook XR-1/GD8000 Docking Station, Rugged, Gamber-Johnson, LLC, 2009, 3 pages.

Panasonic Toughbook 19 MK4/MK5/MK6 Docking Station, 7160-0264-00, Defining Rugged, Gamber-Johnson, LLC, Dec. 22, 2009, 9 pages.

Roaming Technology Pty Ltd. (Jun. 21, 2011). Toughbook and Havis Docking Station [Video file]. Retrieved from https://www.youtube.com/watch?v=QNZGqRmlkrc—still image of product from video.

DataSource Mobility LLC. (Mar. 27, 2009). Havis In-Vehicle Solutions for Panasonic Toughbooks [Video file]. Retrieved from https://www.youtube.com/watch?v=mnPKGBwtMOA—still image of product from video.

GamberJohnsonDealer's channel. (Apr. 12, 2011). Gamber Johnson Notepad V Laptop Computer Mount [Video file]. Retrieved from https://www.youtube.com/watch?v=eUg1BQDsDWk—still image of product from video.

* cited by examiner

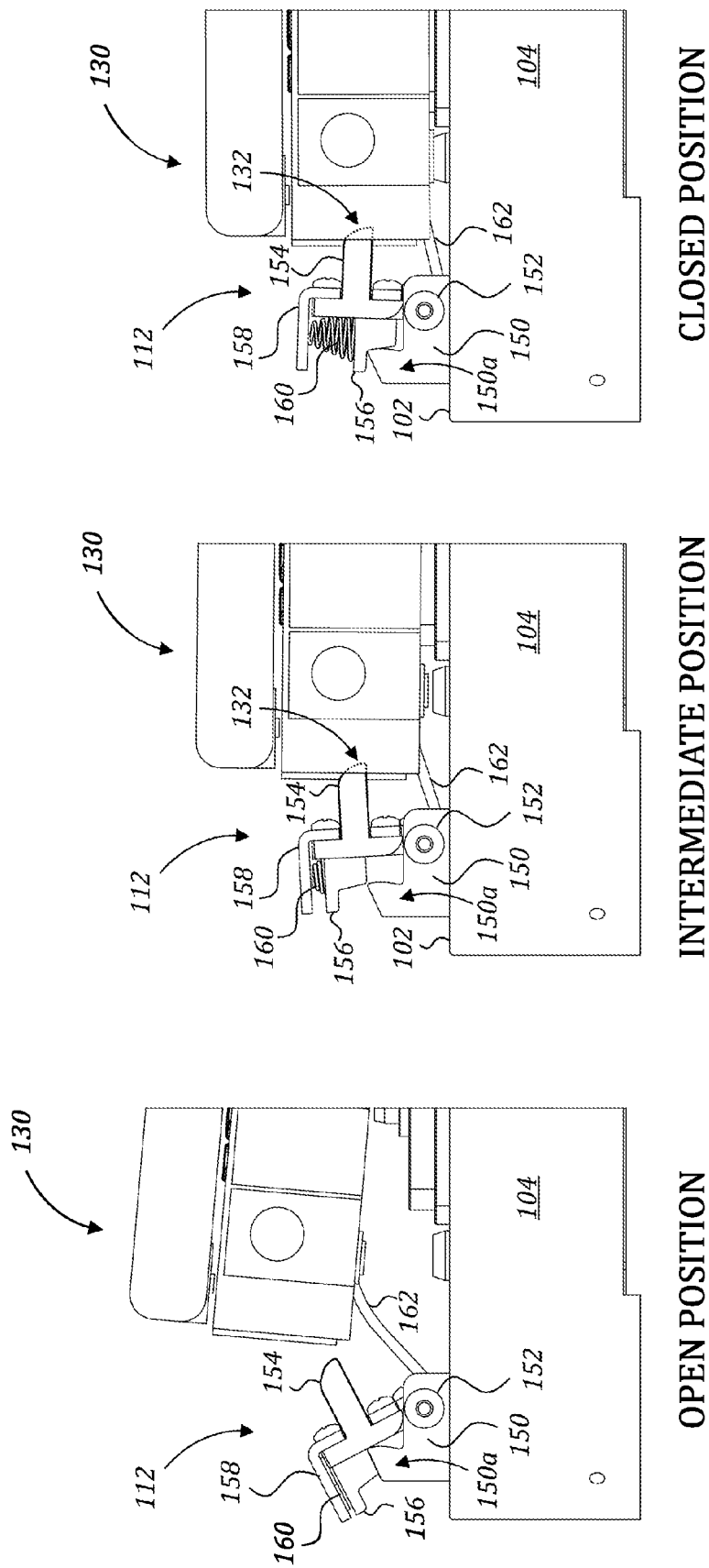

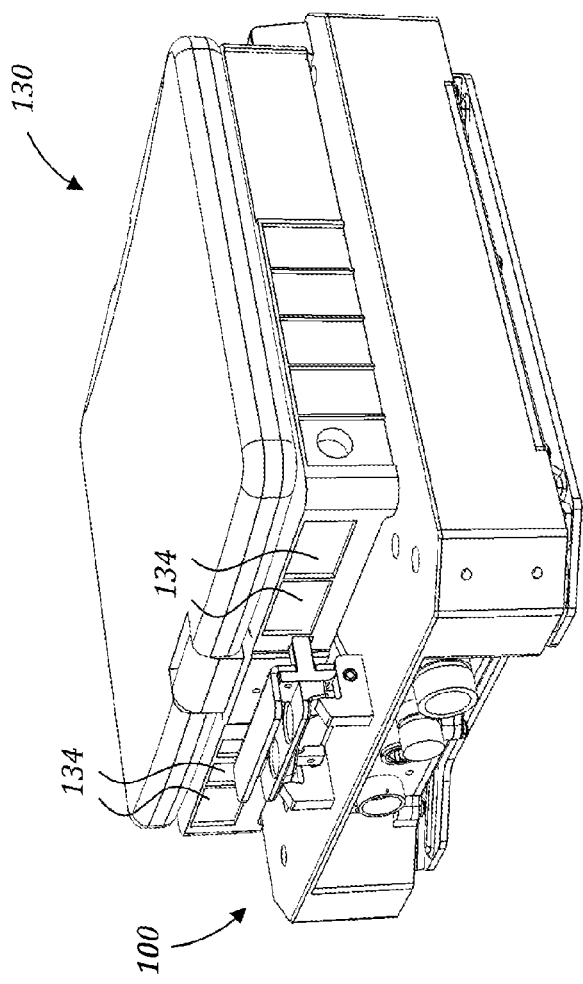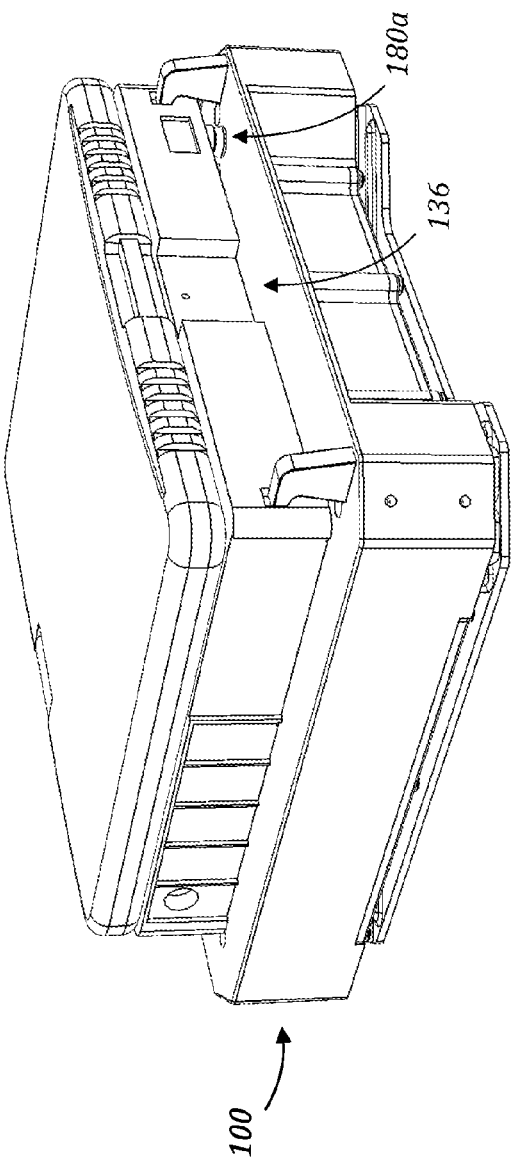

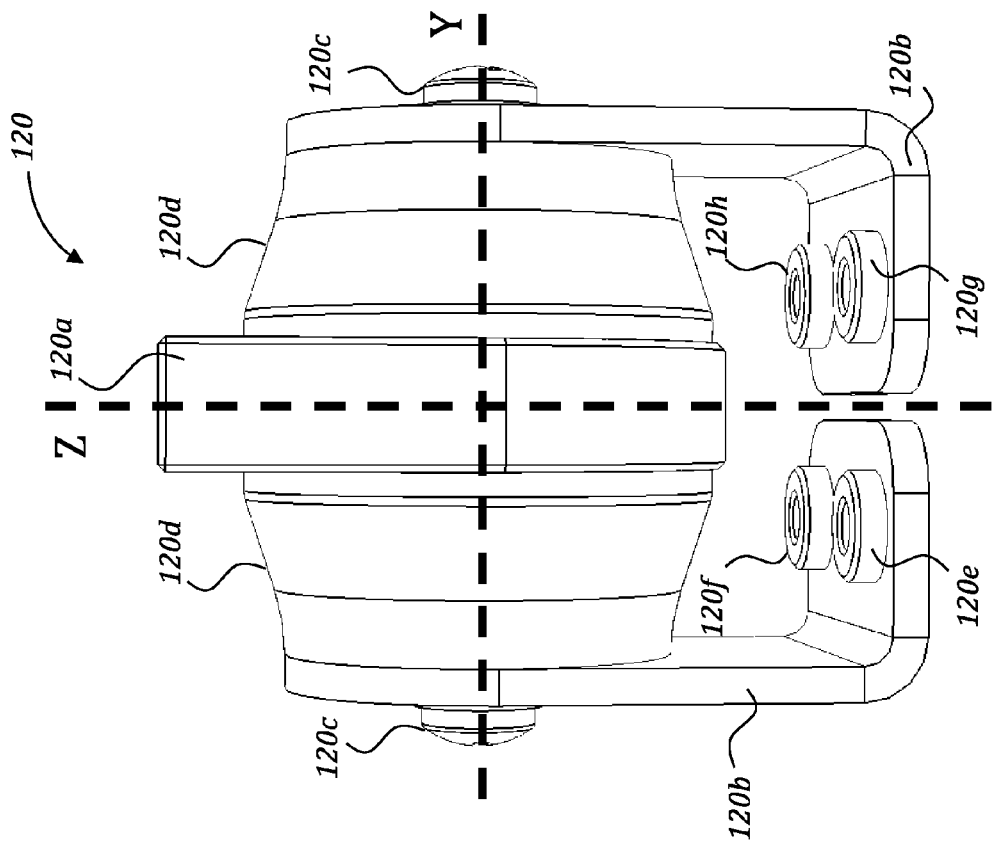
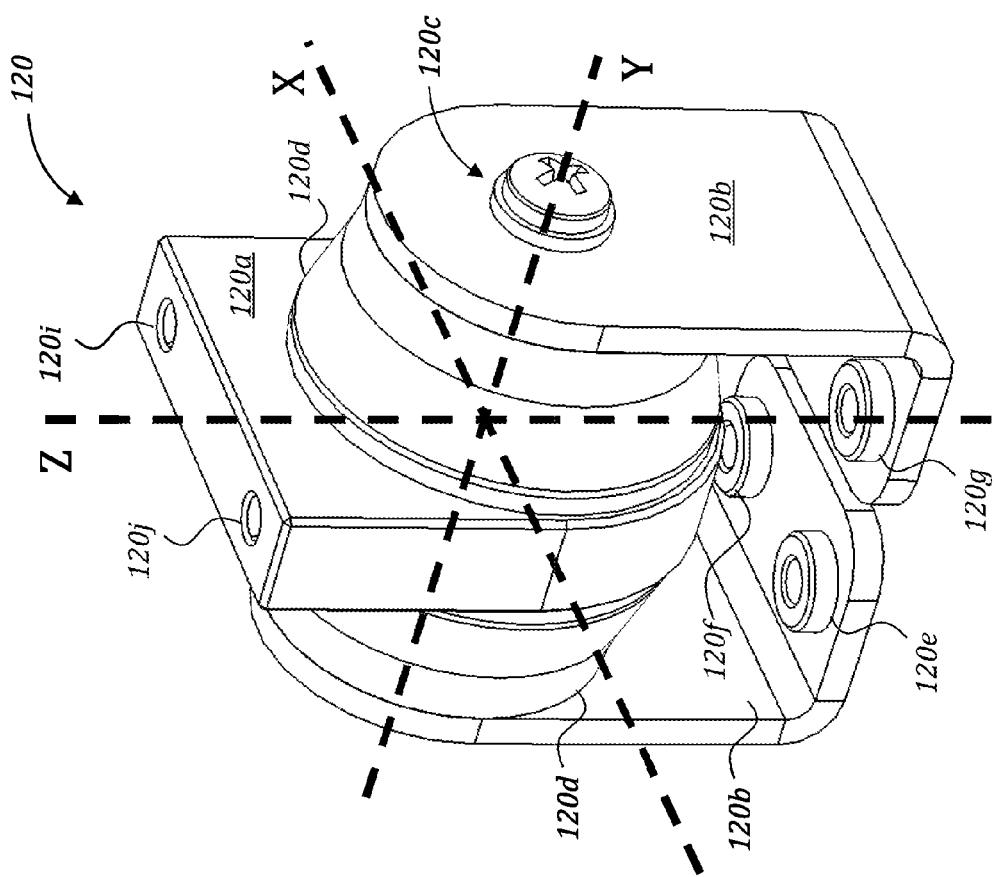
Fig. 8B
Fig. 8A

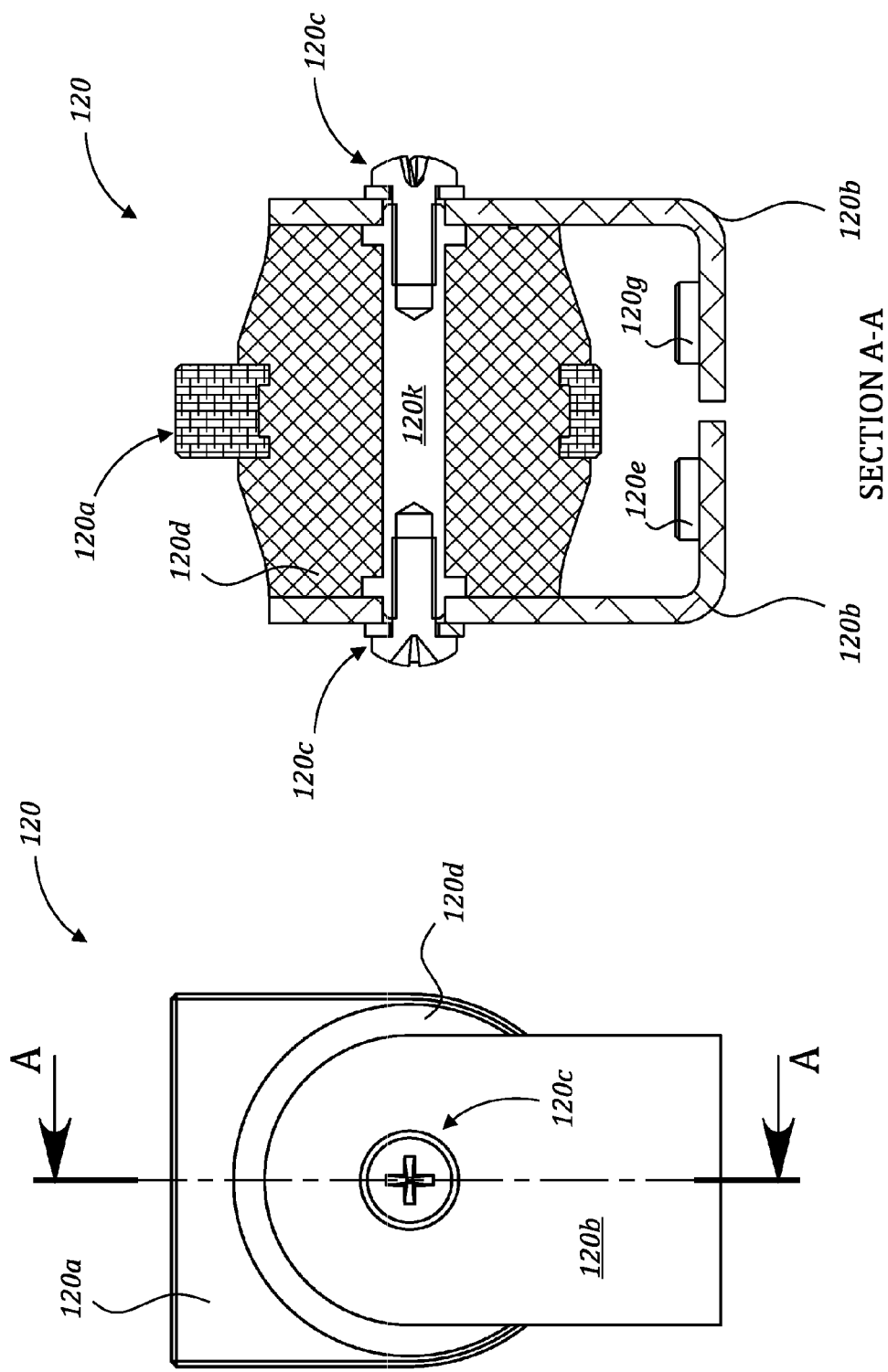

PORTABLE COMPUTER VEHICLE DOCK

CROSS REFERENCE TO RELATED APPLICATIONS

This application is a continuation of U.S. patent application Ser. No. 14/348,713 filed Mar. 31, 2014, entitled "Portable Computer Vehicle Dock", which is a national stage entry of PCT Patent Application No. PCT/IB2012/055232, filed Sep. 30, 2012, entitled "Portable Computer Vehicle Dock", which claims the benefit of priority from U.S. Provisional Patent Application Nos. 61/542,207, filed Oct. 2, 2011, entitled "Portable Computer Vehicle Dock", and 61/657,851, filed Jun. 10, 2012, entitled "Portable Computer Vehicle Dock", which are incorporated herein by reference in their entirety.

FIELD OF THE INVENTION

The invention relates to a portable computer vehicle dock, to a locking mechanism and to a suspension mechanism.

SUMMARY OF THE INVENTION

There is provided, in accordance with an embodiment, an automatically-lockable, shock absorbing dock for a portable computer, the dock comprising: a top plate configured to receive a portable computer, said top plate comprising: an automatic locking mechanism for securing the portable computer to said top plate, a set of connectivity ports, and a port replicator configured to connect the portable computer to the set of connectivity ports; and multiple pairs of shock absorbers connected to a bottom surface of said top plate and configured to connect to a target surface, wherein each pair of shock absorbers is coaxially-positioned and connected to opposite sides of said bottom surface, and wherein each shock absorber has an essentially equal resiliency in its x, y and z axes.

In some embodiments, said locking mechanism comprises: at least one hook for securing a first side of the portable computer to said top plate; and an automatically-lockable handle positioned essentially opposite of said at least one hook, said handle comprising a driving lever, a handle locking tab and an object locking tab.

In some embodiments, said handle locking tab is configured to maintain said handle in an open and locked position in the absence of the portable computer.

In some embodiments, said driving lever is configured to be pushed downwards when engaged by the portable computer, to cause said object locking tab to secure the portable computer from a second side, and to cause said handle locking tab to maintain said handle in a closed and locked position.

In some embodiments, said multiple pairs of shock absorbers comprise two pairs of shock absorbers.

In some embodiments, said pairs of shock absorbers are positioned such that a center of gravity of the portable computer is essentially at an intersection of a central axis of each of said pairs of shock absorbers.

In some embodiments, said pairs of shock absorbers are positioned such that a center of gravity of a combination of the portable computer and the dock is essentially at an intersection of a central axis of each of said pairs.

In some embodiments, said port replicator comprises a computer connector and a printed circuit board (PCB).

In some embodiments, said PCB is between 1.2 mm and 1.8 mm thick.

In some embodiments, said top plate further comprises a peripheral skirt configured to peripherally protect said set of connectivity ports and said port replicator.

In some embodiments, said multiple pairs of shock absorbers are connected to said bottom surface of said top plate peripherally, through said skirt and a bottom guard plate connected to said skirt, wherein said bottom guard plate is configured to protect said set of connectivity ports and said port replicator from below.

In some embodiments, said top plate and said skirt are integrally formed, and wherein a gasket is provided between said skirt and said bottom guard plate, to seal an internal space of said dock against fluids.

In some embodiments, said top plate, said skirt and said bottom guard plate are made of CNC-processed Aluminum, thereby enhancing the seal.

In some embodiments, said top plate, said skirt and said bottom guard plate are made of molded and CNC-processed Aluminum, thereby enhancing the seal.

In some embodiments, said top plate, said skirt and said bottom guard plate are made of CNC-processed Aluminum, thereby providing for enhanced EMI (electromagnetic interference) shielding of at least said port replicator.

In some embodiments, said top plate, said skirt and said bottom guard plate are made of molded and CNC-processed Aluminum, thereby providing for enhanced EMI shielding of at least said port replicator.

In some embodiments, said gasket is disposed inside a trench in said skirt, and said bottom guard plate comprises a protrusion matching said trench, to enhance EMI shielding.

In some embodiments, said gasket is disposed inside a trench in said bottom guard plate, and said skirt comprises a protrusion matching said trench, to enhance EMI shielding.

In some embodiments, the dock further comprises a Faraday cage for containing a power supplier of said port replicator, wherein said Faraday cage is configured to block EMI generated by said power supplier.

There is further provided, in accordance with an embodiment, an automatic locking mechanism for securing an object to a mounting surface, the automatic locking mechanism comprising: at least one hook for securing a first side of the object to the mounting surface; and an automatically-lockable handle positioned essentially opposite of said at least one hook, said handle comprising an object locking tab, a driving lever and a handle locking tab, wherein said handle locking tab is configured to maintain said handle in an open and locked position in the absence of the object, and wherein said driving lever is configured to be pushed downwards when engaged by the object, to cause said object locking tab to secure the object, and to cause said handle locking tab to maintain said handle in a closed and locked position.

There is further provided, in accordance with an embodiment, a suspension mechanism comprising multiple pairs of shock absorbers configured to interface between a suspended object and a target surface, wherein each pair of shock absorbers is coaxially-positioned and connected to opposite sides of said suspended object, and wherein each shock absorber has an essentially equal resiliency in its x, y and z axes.

In some embodiments, said pairs of shock absorbers are positioned such that a center of gravity of the suspended object is essentially at an intersection of a central axis of each of said pairs of shock absorbers.

In some embodiments, said pairs of shock absorbers are positioned such that a center of gravity of a combination of the suspended object and the suspension mechanism is essentially at an intersection of a central axis of each of said pairs.

In some embodiments, each of said shock absorbers comprises a flexible interface connecting two opposing parts.

In some embodiments, the suspension mechanism further comprises a hinge threaded through said flexible interface and said two opposing parts, so as to secure said two opposing parts together upon structural failure of said flexible interface.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 5A shows a side view of an automatically-lockable handle in an open position;

FIG. 5B shows a side view of an automatically-lockable handle in an intermediate position;

FIG. 5C shows a side view of an automatically-lockable handle in a closed position;

FIG. 6A shows a back, perspective view of the dock with a portable computer docked;

FIG. 6B shows a front, perspective view of the dock with a portable computer docked;

FIG. 8A shows a perspective view of one of the shock absorbers;

FIG. 8B shows a front view of the shock absorber;

FIG. 8C shows a side view of the shock absorber;

FIG. 8D shows a cross sectional view of the shock absorber;

DETAILED DESCRIPTION

Figure 1:
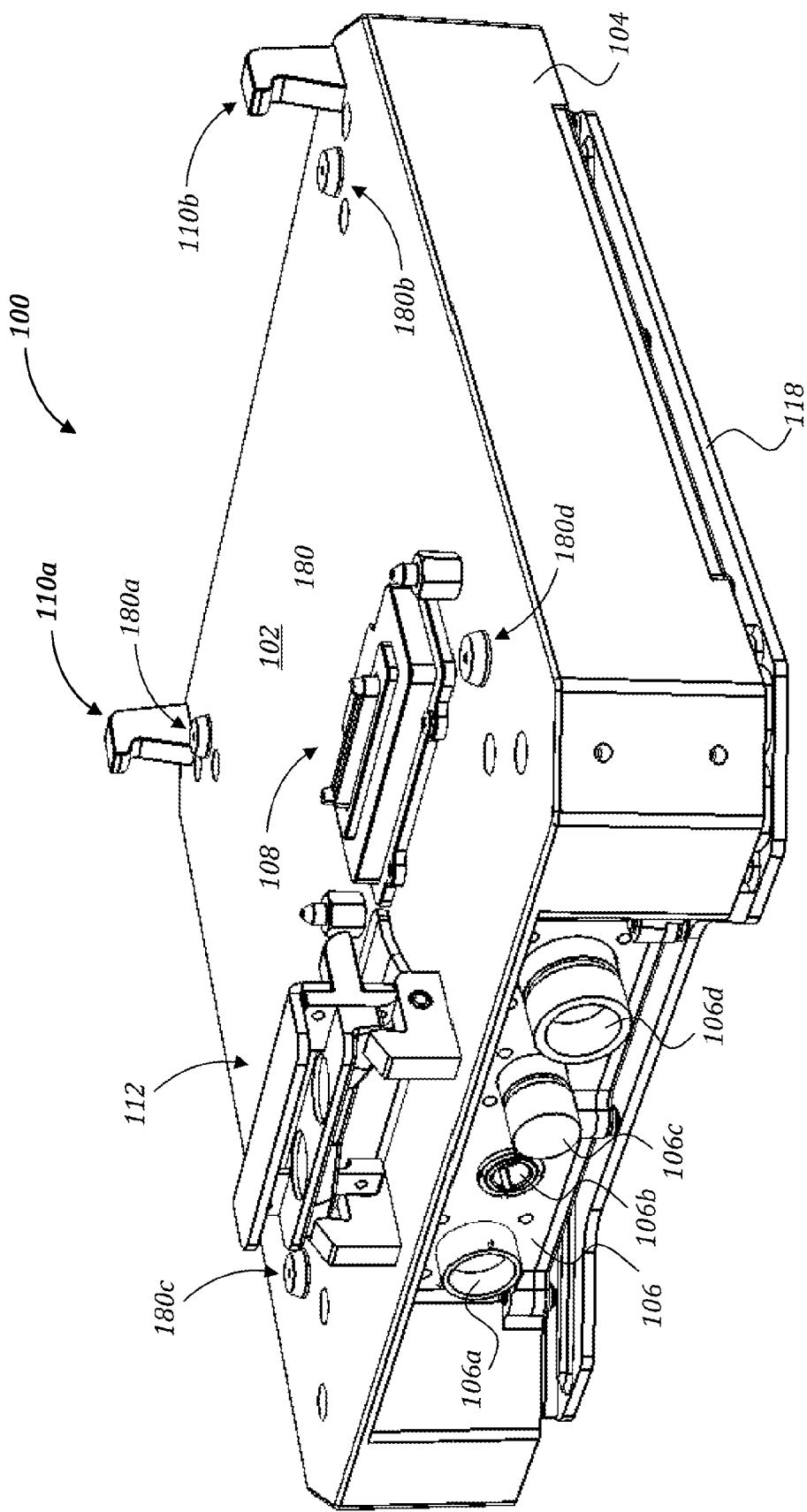
FIG. 1 shows a perspective view of a field-usable dock.
Figure 2:
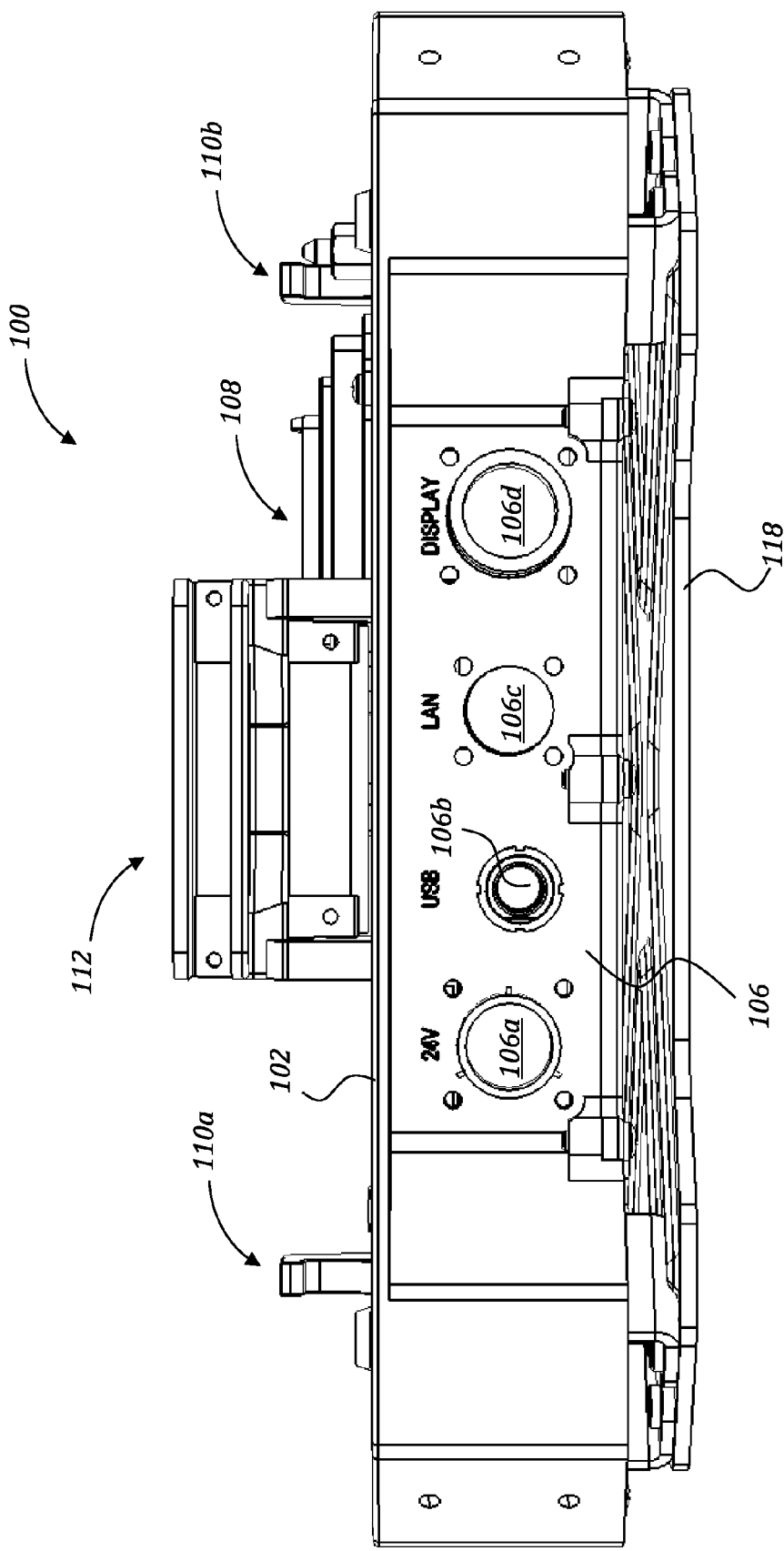
FIG. 2 shows a rear view of the field-usable dock.
Figure 3:
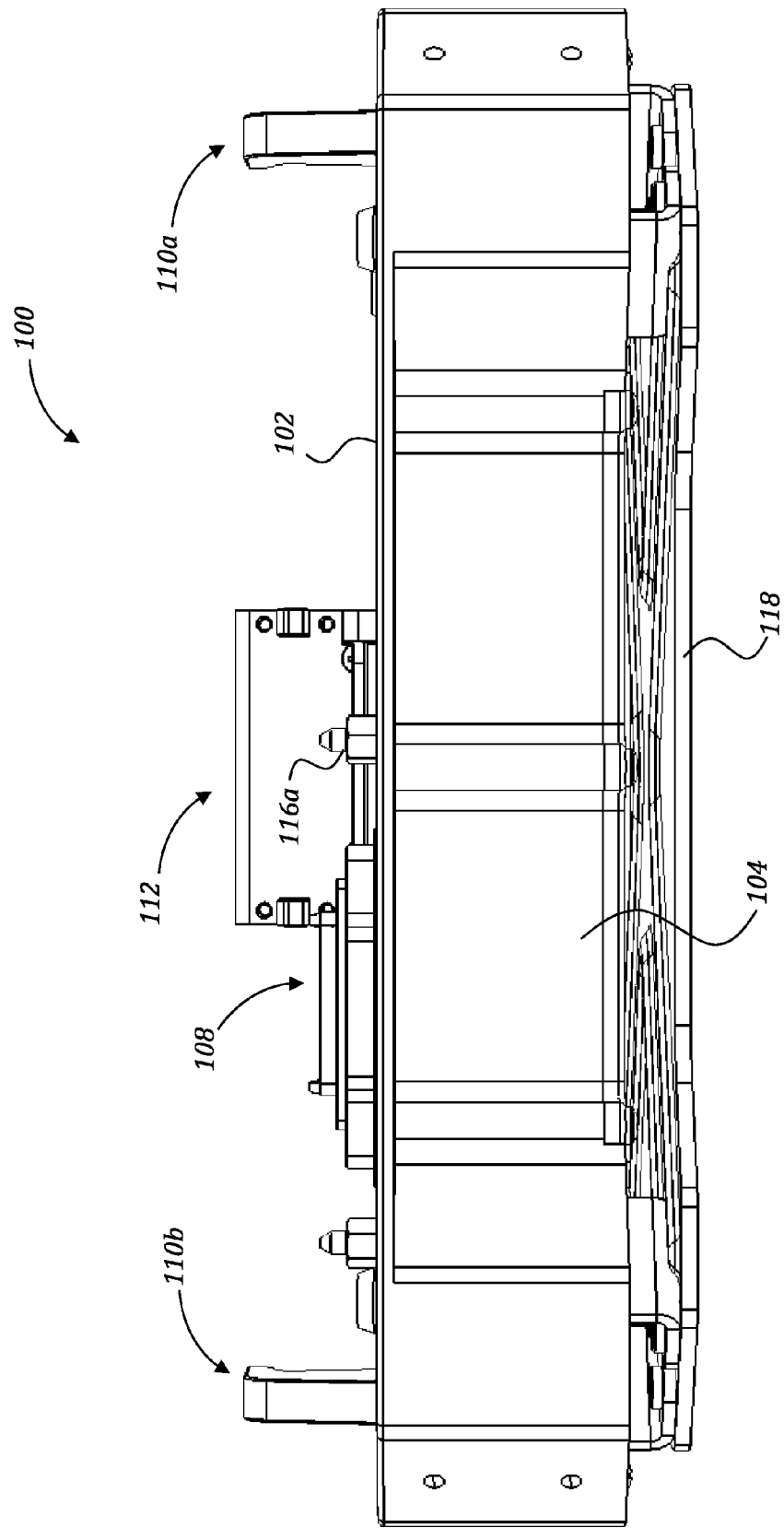
FIG. 3 shows a front view of the field-usable dock.

An aspect of some embodiments relates to a field-usable dock (or a "docking station") for a portable computer, which includes a suspension mechanism configured to protect the computer from shocks resulting, for example, from driving through rough terrain and/or the like. Additionally or alternatively, the dock may include an automatic locking mechanism for securing the computer to the dock in a convenient yet forceful manner. A port replicator may be included in the dock, enabling connection between the portable computer and a set of connectivity ports provided in or on the dock.

The portable computer, in an embodiment, may be a rugged computer adapted for field use. Such computers are widely used today as tactical aids for security forces. An example of one widely-used rugged computer is the Panasonic Toughbook CF19, which is a fully-rugged, convertible tablet PC having a 10.1" display. However, even rugged computers, not to mention regular computers, may be damaged if used extensively in vehicles travelling through hard terrains or suffering from various shocks or impacts. The present field-usable dock provides for excellent shock absorption in such scenarios.

Reference is now made to FIGS. 1, 2, 3 and 4, which show a dock 100 in a perspective view, rear view, front view and lower view, respectively. Most elements of dock 100, or even the entirety of its elements, may be made of a rigid, durable material, such as Aluminum, stainless still or a different metal, or of a hard polymer. For example, dock 100 may be made of CNC-processed Aluminum, which is optionally first given an initial, general shape using molding techniques. This enables dock 100 to be sealed to fluids and/or provide enhanced EMI (electromagnetic interference) shielding, by sparing the need to bend metal plates to form it. Bent metal plates that attempt to provide sealing and/or EMI shielding by closely attaching plate edges are usually less effective than a CNC-processed material, which lacks gaps or loose edges at its corners. The term "EMI", as referred to herein, refers to interference resulting from radiation in the electromagnetic spectrum, commonly in the radio frequency range.

Dock 100 may include a top plate 102 which is configured to receive a portable computer. An optional skirt 104 may be connected to, attached to or integrally formed with top plate 102, for covering one or more sides of dock 100 for aesthetic and/or protection reasons. Furthermore, optional skirt 104 may include a bottom cover (for example, a guard plate 174 shown in FIG. 9) which, when attached to it with an interfacing elastic seal (or "gasket"), provides an internal space of dock 100 having the aforementioned fluid sealing and/or EMI shielding. Specifically, when top plate 102 and skirt 104 are integrally formed from the same block of material using CNC processing, and a guard plate is provided, the sealing/EMI shielding qualities of dock 100 may be enhanced. To improve the EMI shielding, the interfacing elastic seal may be disposed inside a trench in one of skirt 104 or the guard plate, while the other one of the skirt or the guard plate includes a protrusion matching the trench, such that, when the skirt and the guard plate are fastened together, the protrusion prevents a situation where a cross section at the interface between the skirt and the guard plate is only blocked by the elastic seal; from a cross sectional view (not shown), the protrusion blocks EMI waves from migrating sideways into and out of the dock.

Manufacturing dock 100 using CNC techniques may further contribute to the dock's cooling properties. Since CNC manufacturing means that dock 100 is made of only a few pieces of material, such as Aluminum, the material is able to effectively conduct heat out of the dock. Optionally, this spares the need for a fan in dock 100.

Multiple elevation elements, such as four elevation elements 180a, 180b, 180c and 180d may be disposed on top plate 102. Elevation elements 180a, 180b, 180c and 180d may be made of a rigid or semi-rigid material, optionally polymeric. With reference to FIGS. 6A and 6B, these elevation elements (of which only 180a is visible in these figures) may be aimed at slightly elevating a docked computer 130, such that the computer's screen lock handle, shown generally at 136, which is located at the computer's front part, is accessible to the user. The gap formed between the top plate of dock 100 and computer 130 by virtue of the elevation elements enables the user to insert one or more fingers generally beneath screen lock handle 136 and operate it.

Locking Mechanism

An automatic locking mechanism may be provided on top plate 102. The automatic locking mechanism may include one or more, for example two hooks 110a-b for containing and securing one or more sides of the computer. An automatically-lockable handle 112 may be positioned essentially opposite of at least one of two hooks 110a-b.

Reference is now made to FIGS. 5A, 5B and 5C, which show handle 112 in an open position, in an intermediate position and in a closed position, respectively.

Handle 112 may include a base 150 which is connected to, attached to or integrally formed with top plate 102. In a different embodiment (not shown), a designated area, protrusion or depression in the top plate may serve as a base for the handle. A hinge 152 may be provided in base 150, over which are connected, directly or indirectly, an object locking tab 154, a handle locking tab 156 and a handle head 158. When handle 112 is in its open position, handle locking tab 156 may be pushed against a protrusion 150a in base 150 using a resilient member, such as a spring 160, provided between handle head 158 and the handle locking tab. The pushing force, whose vector is indented rearwards in relation to the axis of rotation about hinge 152, locks handle 112 in an open position, thereby preventing free motion and damage to the handle when a portable computer 130 is not docked.

Reference is now made back to FIGS. 1, 2, 3 and 4. When a user desires to dock computer 130 of FIGS. 5A-C in dock 100, he or she first positions one or more sides of the computer under hooks 110a-b. Then, with reference back to FIGS. 5A-C, the user pushes another (optionally opposite) side of computer 130 towards top plate 102, so that the computer engages a driving lever 162 of handle 112, which is affixed in relation to at least an object locking tab 164 of the handle. Hence, when computer 130 is pushed further down, the lowering of driving lever 162 causes object locking tab 164 or even the entire handle 112 to rotate about hinge 152, pushing the object locking tab into a matching recess 132 in computer 130. When computer 130 is fully down, in its docked position, object locking tab 164 is inserted into recess 132 in computer 130, preventing the computer from moving upwards. Handle locking tab 156 then slips forward of protrusion 150a of base 150 and pushed down by spring 160, thereby locking handle 112, and hence also object locking tab 164, in a closed position.

FIGS. 6A and 6B show back and front a perspective views, respectively, of dock 100 with computer 130 docked. Advantageously, at least some of the rear ports of computer 130, such as rear ports 134, are accessible when the computer is docked; the only ports that may be physically blocked are those immediately facing handle 112 of FIGS. 5A-C.

In sum, the locking mechanism allows for convenient docking of computer 130, without necessitating the user's physical interaction with the mechanism; the sole action of pushing computer 130 to position indirectly causes the locking mechanism to operate.

Back to FIGS. 5A-C, in order to un-dock computer 130, the user may simply compress handle locking tab 156 and handle head 160 together, an action which pulls the handle locking tab upwards, above protrusion 150a of base 150. Then, the user may either rotate handle 112 away from computer 130 and lift the computer, or simply lift the computer and cause the handle to be pushed away. Following the lifting of computer 130 at the handle's 112 side, it may be pulled out of hooks 110a-b of FIGS. 1-4 in order to be completely released from dock 100. Then again, handle 112 becomes locked in its open position.

In an embodiment (not shown), the locking mechanism, which includes the handle and optionally the one or more hooks, may be used for a different application. Those of skill in the art will realize the necessary adaptations of the handle, the hooks and/or their positioning, in order to suit them for securing an object, other than a portable computer, to a target surface.

Suspension Mechanism and Shock Absorption

Figure 7:
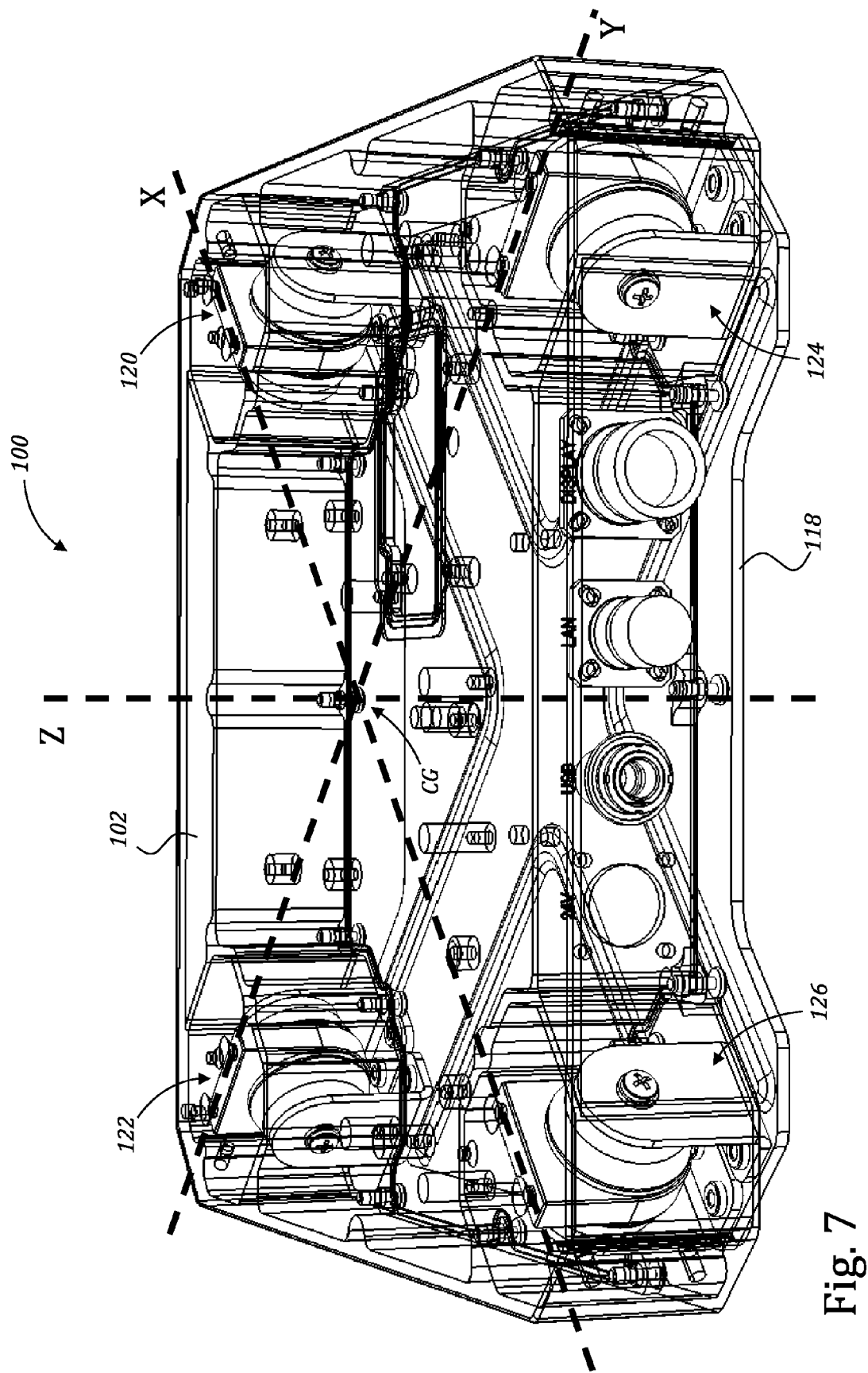
FIG. 7 shows a perspective view of the dock, in which exemplary shock absorbers are visible.

Reference is now made to FIG. 7, which shows dock 100 in a perspective view, with its top plate 102 and skirt 104 transparent. In this view, four exemplary shock absorbers 120, 122, 124 and 126 are visible. In other embodiments (not shown), there may exist more than four shock absorbers, as long as there is an even number of them—for reasons explained below.

Shock absorbers 120, 122, 124 and 126 may be arranged as two coaxial pairs—a first pair which is comprised of shock absorbers 120 and 126 positioned on the X axis, and a second pair which is comprised of shock absorbers 122 and 124 positioned on the Y axis. Each member of a pair is positioned at an opposite side of dock 100; in the exemplary configuration shown in this figure, the pairs are positioned in opposite corners of the dock. The closer shock absorbers 120, 122, 124 and 126 are to the edges of dock 100, the better the shock absorption they provide. In this exemplary configuration, shock absorbers 120, 122, 124 and 126 are positioned almost at the edge of dock 100.

Optionally, shock absorbers 120, 122, 124 and 126 are also arranged such that the coaxes (which are essentially the center axes) of the pairs intersect at a point CG which is directly above, below or at a center of gravity of either the computer alone or of the combined dock and computer. Each one of the coaxial arrangement and the arrangement in relation to the CG may enhance the shock absorption qualities of dock 100. Together, these arrangements provide even better shock absorption.

The advantages of the coaxial positioning of the members of each pair may be better understood by observing FIGS. 8A, 8B, 8C and 8D, to which reference is now made. FIG. 8A shows shock absorber 120 in a perspective view, FIG. 8B in a front view, FIG. 8C in a side view and FIG. 8D in a cross sectional view. For reasons of simplicity, shock absorber 120 was chosen as a representative example of the other absorbers. Shock absorber 120 may include two opposing parts: an upper part 120a and a lower part 120b threaded through a same hinge 120k, wherein the threading is loose enough to provide a certain degree of freedom in the Z and X axes. Hinge 120k is optionally metallic, and may be laterally secured using a pair of screws 120c which are threaded through suitable holes in lower part 120b.

In this example, top part 120a is a single element connectable to top plate 102 of FIGS. 1-4 through a pair of screw holes 120i-j, and lower part 120b includes a pair of elements connectable to a mounting surface 118 of FIGS. 1-4 and 7 using two pairs of screws 120e-g. In this embodiment, mounting surface 118 is provided as part of dock 100, so that the mounting surface itself is mounted onto a suitable target surface in a vehicle. However, in a different embodiment (not shown), no mounting surface may be provided, so that the shock absorbers are mounted directly onto the target surface in the vehicle.

Furthermore, in other embodiments (not shown), a similar shock absorber is constructed using a different number of elements in its lower and/or upper parts, and/or is connected to the top plate and to the mounting surface using other means—while maintaining the principles laid out herein, as will be recognized by those of skill in the art.

A flexible interface 120d may be provided on either side of upper part 120a, around hinge 120k, so as to interface between the upper part and lower part 120*b*. Flexible interface 120*d* may be made of one or more layers of flexible material such as rubber or the like. Flexible interface 120*d* exhibits such a degree of flexibility, resulting from both its material and measurements, which provides for an essentially equal degree of shock absorption on the X, Y and Z axes. This, together with the coaxial pair arrangement and optionally the arrangement in relation to the CG, provides for a balanced and efficient suspension for computer 130. In an embodiment, the term "essentially equal degree of shock absorption" refers to differences of ±5% or less in flexibility between the X, Y and Z axes. In another embodiment, the term "essentially equal degree of shock absorption" refers to differences of ±10% or less in flexibility between the X, Y and Z axes. In yet a further embodiment, the term "essentially equal degree of shock absorption" refers to differences of ±15% or less in flexibility between the X, Y and Z axes. In other embodiments, the term "essentially equal degree of shock absorption" refers to differences of more than ±15% in flexibility between the X, Y and Z axes.

Advantageously, hinge 120*k* provides shock absorber 120 with enhanced safety qualities; the hinge ensures that if flexible interface 120*d* fails structurally and becomes detached or torn, upper part 120*a* and lower part 120*b* will remain secured to one another through the hinge. Detachment of flexible interface 120*d* may result, for example, from natural wear and/or from excessive strain exerted on it. Hinge 120*k* ensures the integrity of shock absorber 120 even in extreme conditions, when flexible interface 120*d* is unable to carry the load.

In an embodiment (not shown), the suspension mechanism, which includes the arranged shock absorbers, may be used for a different application. Those of skill in the art will realize the necessary adaptations of the shock absorber arrangement in order to suit it for suspending an object other than a portable computer.

Electronic Interface

Figure 9:
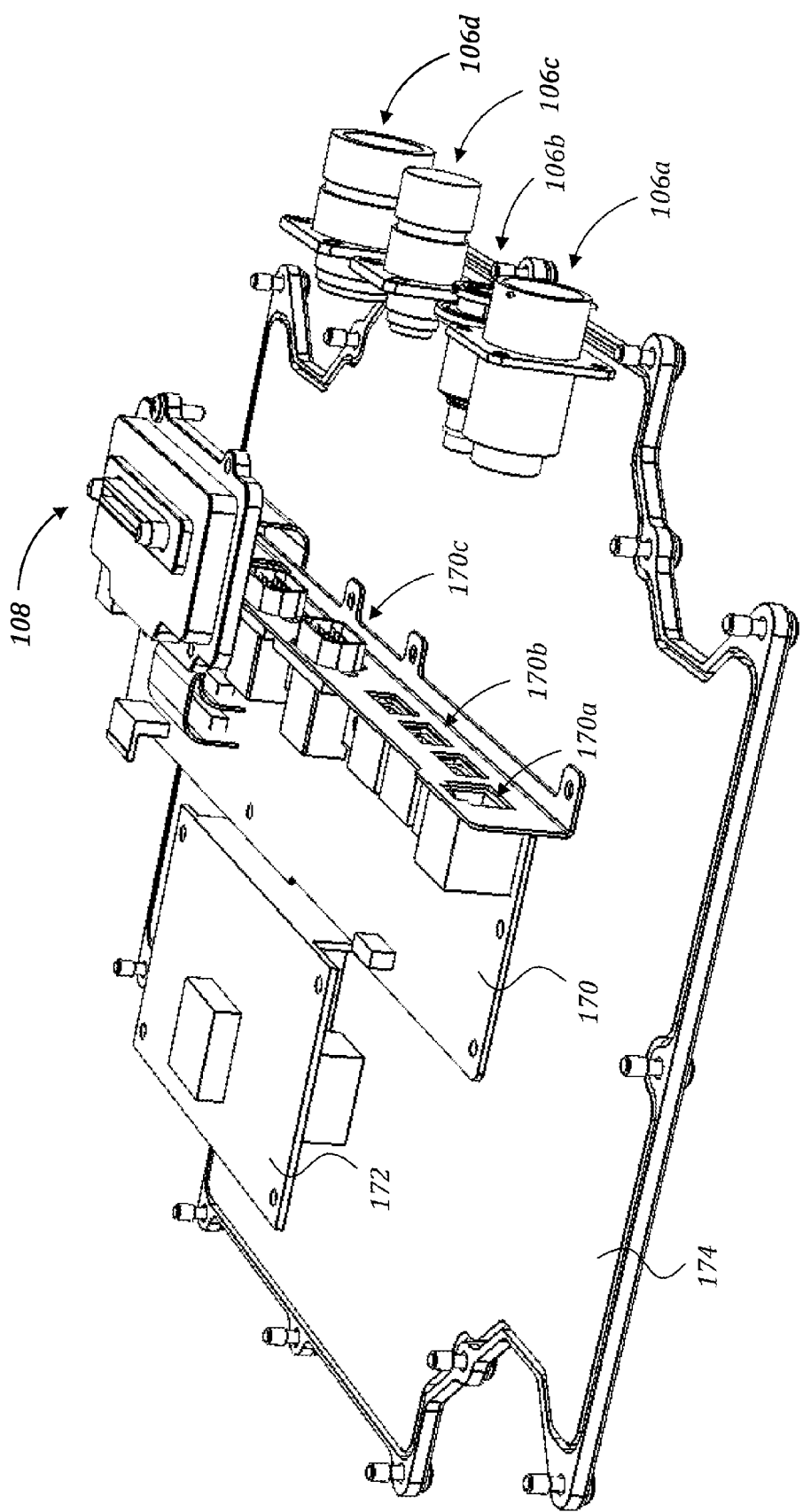
FIG. 9 shows a perspective view of an electronic interface of the dock.

Reference is now made to FIG. 9, which shows an electronic interface of dock 100 of FIGS. 1-4 and 6-7. The electronic interface may be also referred to as a "port replicator". The electronic interface enables the portable computer to be connected to external sources, such as power, network, a pointing device, a GPS receiver, a printer etc. when docked. The electronic interface may connect to the portable computer using a computer connector 108. Computer connector 108 may be connected, optionally through a printed circuit board (PCB) 170-172, to a set of connectivity ports, such as connectivity ports 106*a-d*. This connection may be referred to as "port replication". A set of ports may be provided on PCB 170-172, such as an RJ45 LAN port 170*a*, a USB port 170*b* and a VGA port 170*c*, from which cables extend to suitable ones of connectivity ports 106*a-d*.

PCB 170 and/or 172 may be of a high rigidity grade and optionally complies with rigidity standards. For example, PCB 170 and/or 172 may be thicker than non-high rigidity grade PCB's; for instance, the PCB may be between 1.2 mm and 1.8 mm thick. PCB 170 and/or 172, as well as any electronic components disposed on it, may be made of materials able to withstand relatively high temperatures, which are not common in regular operating environments of computers.

An optional guard plate 174 may be positioned below top plate 102 and peripherally of otherwise connected to skirt 104 of FIGS. 1-4, for protecting PCB 170 and/or the internal portion of connectivity ports 106*a-d* from damage. Guard plate 174, in this embodiment, is not connected to mounting surface 118 but it rather suspended above it.

A Faraday cage may be provided on either guard plate 174 or skirt 104 of FIGS. 1-4, for encompassing a power supplier (not shown) of the dock. The Faraday cage may block at least some of the EMI radiation normally generated by the power supplier.

Mounting Bracket

Figure 4:
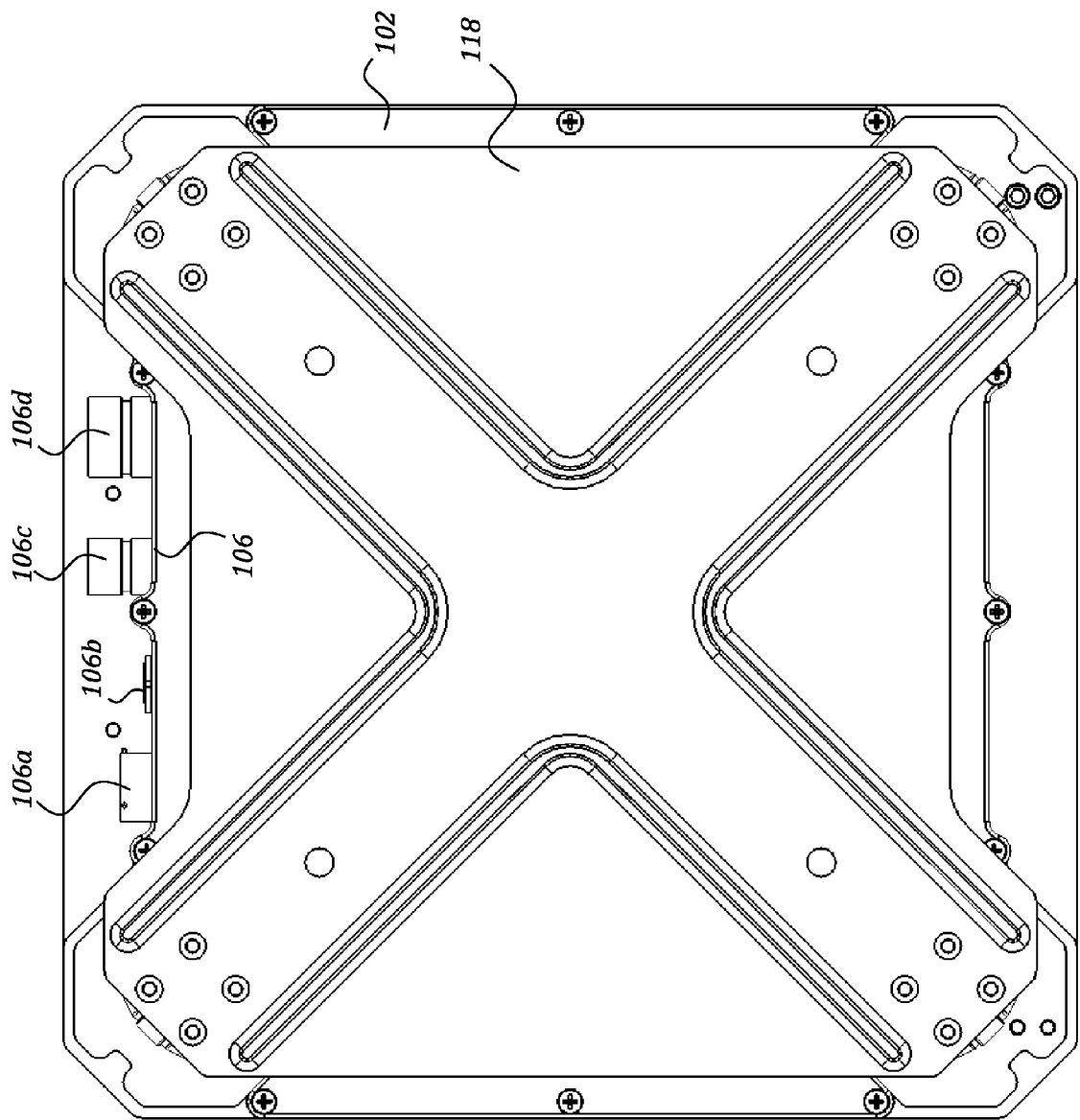
FIG. 4 shows a lower view of the field-usable dock.
Figure 10:
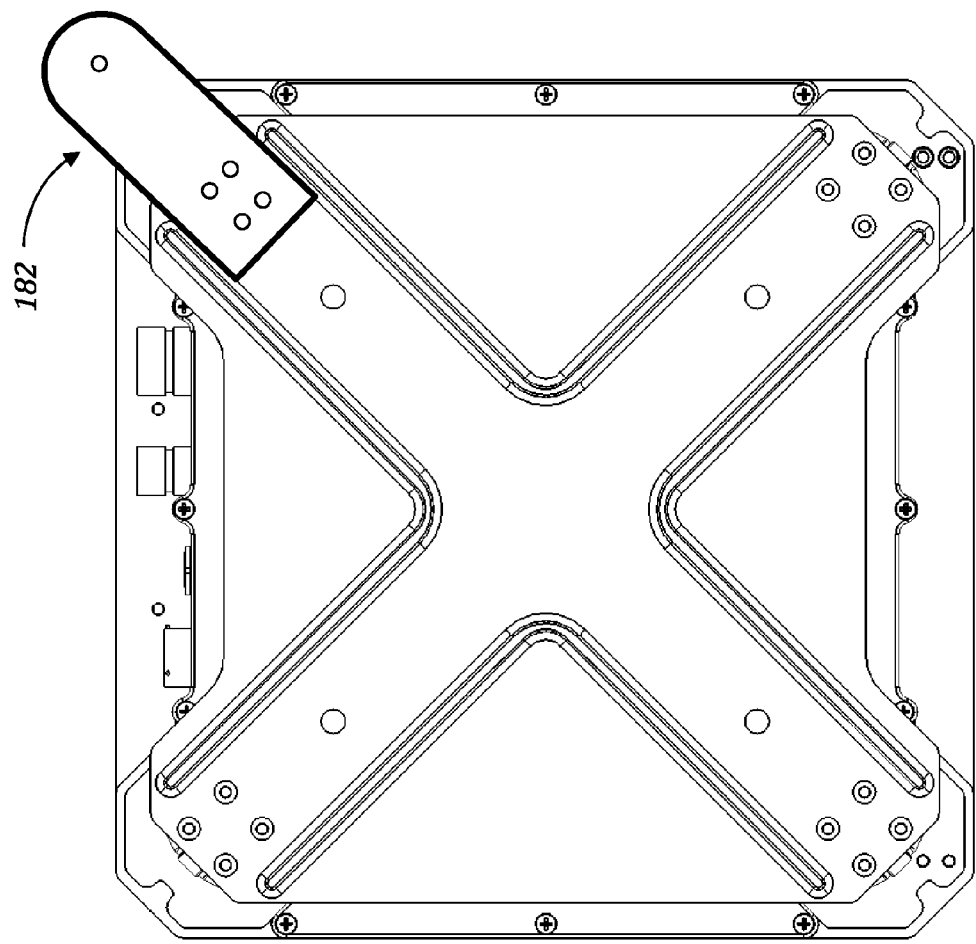
FIG. 10 shows a lower view of the field-usable dock, with an exemplary mounting bracket.

Reference is now made to FIG. 10, which shows a dock from a view similar to that of FIG. 4, and demonstrates an optional mounting bracket 182 which enables attachment of the dock to a surface without requiring access to the back of the surface. For simplicity of illustration, only a single mounting bracket 182 is shown, but three more may exist at the three other corners of the dock. Mounting bracket 182 may connect to dock using one or more screws, and connect to the mounting surface using one or more screws using one or more holes provided in a portion of mounting bracket 182 which extends beyond the edge of the dock. This way, the screws may be threaded from the direction of the dock and no access to the back side of the mounting surface is required. If no extension of a mounting bracket beyond the edge of the dock is provided, then screws may need to be threaded from the other side of the mounting surface, through the mounting surface and into the dock. This option is also intended in some embodiments.

In the claims and description of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A shock absorbing device for essentially isotropic resiliency, comprising:
   an upper part comprising an interface orifice and at least one upper attachment element that is disposed at a top surface of said upper part, wherein a central axis of said interface orifice is in a horizontal Y direction;
   at least one lower part, each comprising:
   (a) a base plate comprising at least one lower attachment element disposed at a bottom surface of said base plate, wherein said bottom surface is substantially parallel to said top surface of said upper part, and
   (b) an upright plate comprising a hinge securing element, wherein said upright plate is substantially perpendicular to said bottom surface, and wherein said hinge securing element is substantially coaxial with said interface orifice of said upper part;
   a hinge secured to said hinge securing element, wherein said hinge is substantially coaxial with said interface orifice and said hinge securing element; and
   a flexible interface element comprising:
   (i) a hinge orifice, wherein said hinge is positioned through said hinge orifice,
   (ii) at least one flat side flush with said upright plate and being perpendicular to said horizontal Y direction, and
   (iii) an annular recess flush with said interface orifice of said upper part;
   wherein said flexible interface element is positioned within said interface orifice to flexibly couple said upper part to said at least one lower part with essentially isotropic resiliency.

2. A computer dock for a portable computer comprising a pair of said shock absorbing device according to claim 1, wherein said computer dock comprises a top plate, configured to receive and suspend a portable computer, attached to said at least one upper attachment element, wherein said top plate comprises:
(a) an automatic locking mechanism for securing the portable computer to said top plate,
(b) a set of connectivity ports, and
(c) a port replicator configured to connect the portable computer to the set of connectivity ports;
wherein said at least one lower attachment element is configured to attach to a target surface, wherein said horizontal Y directions of said pair are substantially aligned.

3. The computer dock of claim 2, further comprising a second pair of said shock absorbing device, wherein said horizontal Y directions of said second pair are substantially aligned.

4. The computer dock of claim 3, wherein said pair and said second pair are positioned on said top plate such that a center of gravity of the suspended portable computer is essentially at an intersection of said horizontal Y directions.

5. The computer dock of claim 3, wherein said pair and said second pair are positioned on said top plate such that a center of gravity of a combination of the suspended portable computer and the computer dock is essentially at an intersection of said horizontal Y directions.

6. The shock absorbing device of claim 1, wherein said hinge is configured to secure said upper part and at least one lower part upon structural failure of said flexible interface element.

7. The shock absorbing device of claim 1, wherein said flexible interface comprises at least one layer of flexible material from a group comprising a rubber material, a natural rubber material, a synthetic rubber material, a latex material, an elastomeric material, a latex material, a synthetic viscoelastic urethane polymer material, Sorbothane®, and an elastic polymer material.

* * * * *